Patented June 11, 1946

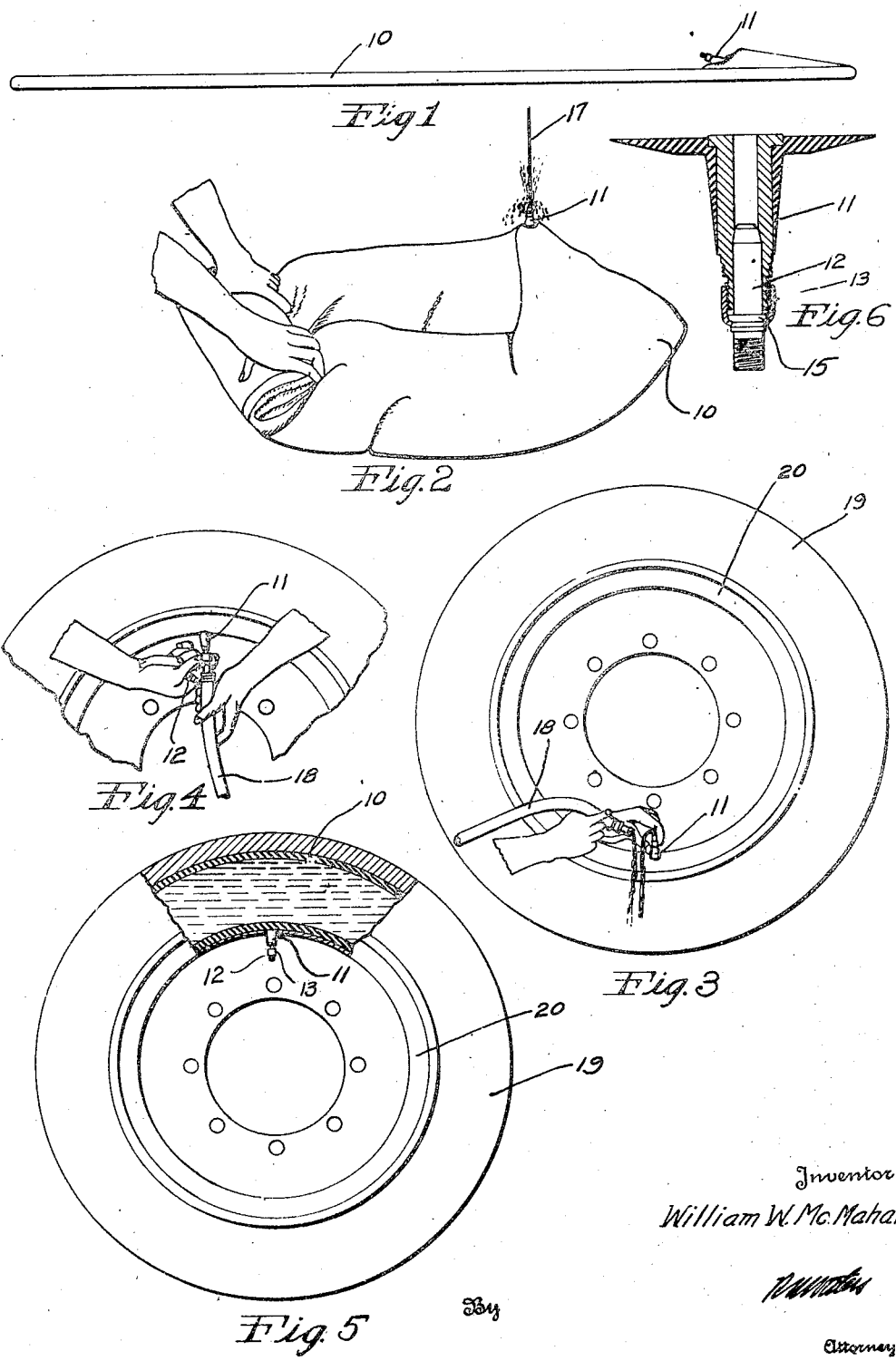

2,401,950

UNITED STATES PATENT OFFICE 2,401,950

METHOD OF FILLING TIRES WITH LIQUID

William W. McMahan, Akron, Ohio, assignor to Wingfoot Corporation, Akron, Ohio, a corporation of Delaware Application February 19, 1944, Serial No. 523,071

6 Claims. (Cl. 152—415)

This invention relates to a method of filling tires with liquid, and it refers especially to filling tires of comparatively large cross-section such as are used on farm tractors and earth-moving machinery, etc., and which contain inner tubes equipped with valves of two-piece construction to readily permit the inner mechanism of the valve to be easily removed to allow the free flow of liquid into the tire and quickly replaced when the liquid supply is disconnected from the valve stem.

According to this invention a tire may be completely (100%) filled with a liquid. The liquid may consist entirely of water or the water may contain calcium chloride or other salt to prevent freezing in cold weather.

An object of this invention is to completely fill a tire containing an inner tube with a liquid to the exclusion of all air that would otherwise be trapped therein. If air is not excluded it escapes during the use of the tire by seeping through the tire carcass, causing a drop of pressure therein, and requires frequent additions of liquid to keep the tire at a safe and proper working pressure. This frequent addition of liquid will ordinarily be required until all air has escaped and the tire is completely full of liquid. When the tire is properly mounted and filled with liquid in the absence of air, the pressure will remain constant, because there is no loss of the liquid due to seepage as there is with air. Thus it will be apparent that time, trouble and worry will be eliminated and better operating conditions maintained without requiring a lot of special equipment.

The invention may be more readily understood from the following description in connection with the accompanying drawing wherein Figure 1 is a side elevation of an inner tube laid out flat;

Figure 2 illustrates the tube with its valve suspended above the remainder of the tube body and rolled to evacuate trapped air;

Figure 3 shows a tire and the tube from Figure 2 assembled on a wheel and the liquid supply hose being connected;

Figure 4 shows the liquid supply hose being disconnected;

Figure 5 shows the tire and tube mounted on a wheel and completely filled with liquid; and Figure 6 is a cross-sectional view of one form of two-piece valve used in practicing this invention.

Referring to the drawing, the numeral 10 designates an inner tube laid out flat so that the valve 11 is at one end thereof. With the tube in this position the upper or outer part 12 of the valve 11, which contains the inner mechanism or valve insides, is removed by unscrewing the nut 13 which revolves independently of the body part 12 by having its outer edge turned over the flange 15. Thus it will be apparent that the upper part of the valve 12 may be quickly removed or replaced to permit a free passage of liquid into or out of a tire which saves much more time than would otherwise be possible. This type valve is a commercial article and is not claimed in this invention.

When the upper part of the valve or the valve inside is removed, the valve stem 11 is suspended by a cord or wire 17 so that it is elevated somewhat higher than the body of the tube 10. A hose 18 equipped with a suitable fitting is connected to the valve stem and liquid under pressure is passed into the tube to about 25% of its full capacity, after which the hose is disconnected. The end of the tube farthest from the valve stem is then grasped and rolled as tightly as possible toward the valve stem. This expels all air contained in the tube (see Figure 2) and when a solid stream of liquid void of air flows from the valve stem, the top part of the valve is replaced, the tube is then placed in a tire 19 and the tire mounted on a wheel 20. The assembly is then rotated until the valve is in its lowermost position, the top part of the valve again removed, and while liquid is flowing from said tube the hose 18 is again connected to the valve stem. It is important to also allow liquid to flow slowly from the hose, this prevents air that may be trapped therein from entering the tube. By thus permitting water to flow from the valve stem and hose while connection is made, a liquid seal is created which positively prevents air from entering the tube.

By grasping the inner tube at its end farthest remote from the valve stem and rolling the tube body toward said valve the liquid that has been forced into said inner tube and the trapped air therein is caused to be forced toward the valve stem under a slight pressure due to the rolling and compacting of the tube body, the trapped air therein will bubble through the liquid and escape through the valve stem, as illustrated in Figure 2, until liquid begins to flow from said stem. The rolling of the tube is gradually continued until no air bubbles appear indicating that all air has been expelled from the tube and liquid filling or flowing from the valve stem will act as a liquid seal to prevent air from entering the tube through said valve stem while connecting or disconnecting the liquid supply hose.

When the hose is connected to the valve stem as described, liquid is passed into the tire under pressure and continues to pass therein until the pressure is somewhat higher than that required under actual working conditions. Then the tire is revolved so that the valve is in its uppermost position (as shown in Figure 4), the hose disconnected and the top part of the valve containing the innner mechanism of the valve is replaced in said valve stem. The wheel with the tire mounted thereon is then placed on a tractor or machine on which it is to be used and the pressure within the tire adjusted to the desired pressure by allowing the proper amount of liquid to escape.

From the foregoing description it will be obvious that by the method disclosed therein a tire can be completely filled with a liquid without the use of special equipment, that only ordinary skill is required to practice the method, and the complete initial filling of tires of this character will save time and worry and will eliminate the most common cause of tire damage, that of under inflation.

What I claim is:

1. A method of filling a tire containing an inner tube with liquid consisting of the following steps: laying the tube on a flat surface and arranging it so that the valve is at one end thereof, removing the inner mechanism from said valve, elevating the valve stem by suspension so that same is at a substantially higher elevation than the remainder of the tube, injecting liquid under pressure into said tube to about 25% of its full capacity, then, starting at a point most remote from the valve stem, tightly rolling the tube body, working the roll toward the valve stem until all air is expelled and until liquid free from air flows from the valve stem, at this point replacing the inner valve mechanism, then placing the partially liquid-filled tube in a tire casing and mounting said tire on a wheel, placing said wheel with tire mounted thereon in a vertical position, rotating said wheel so that the valve stem is at its lowermost position, removing the inner valve mechanism from said valve stem, allowing liquid to flow from said valve stem, connecting a source of liquid under pressure while liquid is flowing from said valve stem and also flowing slowly from said source of supply while connection is being made, then completely filling the tire with the liquid under pressure, until the tire pressure is above the normal pressure required, disconnecting the source of liquid supply and replacing the inner valve mechanism, then adjusting the tire pressure to its normal working requirement.

2. The method of filling a resilient vehicle tire with liquid solution comprising the following steps: providing an uninflated inner tube, spreading same out on a flat surface and removing the valve insides, elevating the valve stem above the remainder of the tube, supplying the tube with liquid to about 25% of its full capacity, rolling the tube until liquid flows from said valve stem and all air is expelled, replacing the valve insides, placing said tube in a tire and mounting said tire on a wheel with the valve in its lowermost position, removing said valve insides, connecting a source of liquid under pressure while liquid is flowing from said valve stem, and also flowing slowly from said source of supply, then filling the tire with liquid under pressure until the tire pressure is above normal working pressure, rotating the wheel so that the valve is in its uppermost position, disconnecting the source of liquid supply, replacing the valve insides, and adjusting the tire pressure to normal working requirement.

3. The method of completely filling a tire tube having a single valve opening with liquid and completely eliminating the presence of air therein, comprising the following steps: partially filling the tire tube with a liquid, rolling and compacting said tube to force the liquid into a space in and adjacent the valve stem, said space being of a capacity to contain the liquid only, whereby air is forced from said tube and a liquid seal created and maintained in said valve stem to permit connecting and disconnecting a hose to said valve stem to fill said tube with a liquid to a desired pressure, without permitting air to enter said tube.

4. The method of filling a tire containing an inner tube completely full of liquid under pressure comprising the following steps: partially filling the tube with a liquid, evacuating trapped air from said tube by rolling and compacting said tube so that the space in and adjacent the valve stem is filled with liquid thereby creating a liquid seal so that air will be excluded from said tube while the liquid supply line is connected and disconnected from said valve stem.

5. In the method of inflating an inner tube with liquid to the exclusion of all air comprising the steps of partially filling the inner tube with liquid, manipulating the inner tube to expel the trapped air therein, creating a liquid seal in the valve stem of said tube, then introducing liquid only through said liquid seal to build up a desired liquid pressure within said tube.

6. The method of completely filling with liquid an inner tube having a single valve opening therein, comprising the steps of partially filling the tube with liquid, compacting the tube for confining the liquid to a space in and adjacent to the valve opening until liquid alone occupies said space and seals the valve opening against the entrance of air to said tube and thereafter filling the tube with liquid to the desired pressure whereby the tube will be entirely free of trapped air.

WILLIAM W. McMAHAN.